United States Patent [19]

Shapcott

[11] Patent Number: 5,344,300
[45] Date of Patent: Sep. 6, 1994

[54] TIMING DEVICE FOR A PLASTIC PROCESSING SYSTEM

[75] Inventor: Michael Shapcott, Hometown, Pa.

[73] Assignee: Zapata Technologies, Inc., Hazelton, Pa.

[21] Appl. No.: 21,032

[22] Filed: Feb. 22, 1993

[51] Int. Cl.⁵ .......................... B29C 47/34; B65B 3/04
[52] U.S. Cl. .................................. 425/142; 141/183; 141/187; 141/189; 425/155; 425/168; 425/308; 425/311; 425/315; 425/404
[58] Field of Search ............... 425/142, 155, 168, 308, 425/310, 311, 312, 313, 315, 404; 141/183, 187, 188, 189, 190, 191

[56] References Cited

U.S. PATENT DOCUMENTS

| | | | |
|---|---|---|---|
| 1,380,623 | 6/1921 | Wright | 74/242.1 |
| 2,491,395 | 12/1949 | Searle et al. | 425/312 |
| 2,897,683 | 8/1959 | Carver | 74/242.1 |
| 3,015,236 | 1/1962 | Toensing | 74/84 |
| 3,081,643 | 3/1963 | Huboi et al. | 74/242.1 |
| 3,414,938 | 12/1968 | Caviglia | 425/308 |
| 3,577,595 | 5/1971 | Smith et al. | 264/268 |
| 3,825,044 | 7/1974 | Lidikay et al. | 141/187 |
| 3,963,396 | 6/1976 | Shotbolt et al. | 425/135 |
| 4,060,053 | 11/1977 | Ohmi | 118/215 |
| 4,080,136 | 3/1978 | Peller | 424/295 |
| 4,177,689 | 12/1979 | Zeilinger et al. | 74/242.8 |
| 4,544,314 | 10/1985 | Partyka | 413/26 |
| 4,767,383 | 8/1988 | St. John | 474/133 |
| 4,798,562 | 1/1989 | Matson et al. | 474/101 |
| 4,799,846 | 1/1989 | Wissman et al. | 413/66 |
| 4,810,236 | 3/1989 | Kumm | 474/101 |
| 4,863,417 | 9/1989 | Kimata et al. | 474/101 |
| 4,881,928 | 11/1989 | Bernal | 474/111 |
| 4,881,929 | 11/1989 | Randles | 474/111 |
| 4,929,218 | 5/1990 | Clough | 474/83 |

Primary Examiner—Khanh Nguyen

[57] ABSTRACT

An apparatus for cutting and dispensing segments of thermoplastic material into receptacles such as crowns includes a conveyor for conveying the crowns through a passageway at predetermined speeds, an extruder for extruding thermoplastic material through a discharge opening, a rotary knife having blades for cutting the extruded material into segments and depositing the segments into the receptacles as they are conveyed through the passage, and an adjustable belt drive system for rotating the blade in response to the conveying of the receptacles. The belt drive system includes a drive and driven pulley, two pairs of fixed idler pulleys, and a third pair of idler pulleys which are coupled to a laterally shiftable carrier.

22 Claims, 2 Drawing Sheets

TIMING DEVICE FOR A PLASTIC PROCESSING SYSTEM

BACKGROUND OF THE INVENTION

This invention relates to a plastic processing system, and more particularly to a drive system for moving open-topped receptacles such as crowns along a conveyance path and accurately positioning extrudate segments into the centers thereof.

In high speed crown making systems, a pellet of extruded thermoplastic material is deposited into each crown shell by controlling the rate of extrusion of the thermoplastic material and then directing this material through one or more rotating cutting blades timed to the feed rate of the crowns past the depositing station. To ensure that the severed segments of thermoplastic material are consistently deposited in the centers of the traveling crowns, the speed of the conveyor, the feed rate of the thermoplastic material, and the angular velocity of the cutting blades are maintained in a proportional relationship that varies with the rate of production. For any rate of production, the feed rate of the crowns must be compatible with the cutting rate of the blades, and these in turn must be compatible with the minimum cooling rate of the formed liner.

The characteristics of the various types of thermoplastic material available introduce other considerations into the placement of the extruded segments. When PVC compositions are utilized, the crown shells are heated before the segments of lining material are deposited centrally therein. When PVC-free materials are utilized, the crown shells are not heated until after the segments have been deposited. Because PVC-free segments tend to slide, it is necessary to compensate by depositing them so that they are slightly offset from the shell centers. Thus, for a crown processing apparatus to be adapted for use with both PVC and PVC-free lining materials, it is necessary to provide some means for adjusting the location of the shells on which the segments are deposited.

An illustrative apparatus for forming liners in crowns is described in U.S. Pat. No. 3,360,827 to Aichele, wherein a rotatably mounted blade is rotated in synchronism with the movement of a conveyor. The cutting blade is rotated at a uniform speed that is directly proportional to the speed of shell conveyance. During each rotation of the knife, a segment or pellet of extruded thermoplastic polymer is severed, and the radial tip of a blade enters and exits the recess of a shell as it is conveyed, thereby depositing the polymer pellet centrally therein. A subsequent operation forms the pellet into a desired liner shape.

Although the high feed rate apparatus disclosed in the Aichele patent operates satisfactorily for providing thermoplastic material in bottle caps or crowns, difficulties have been encountered in insuring that the thermoplastic material is deposited in the center of the receiving crown. Even relatively minor variations in timing can have a substantial effect on the accuracy of the Aichele device. It will be appreciated that with certain lining materials, if the severed segment is deposited at any place other than the center of the receiving crown, a liner of non-uniform thickness and/or misaligned position will result. Thus, when timing variations occur, it is necessary to stop operating the Aichele device until timing adjustments can be made, thereby causing considerable losses in time and production. Another drawback of the Aichele system is that there are no provisions for adjusting the tension in the drive belt during production.

In U.S. Pat. No. 3,825,044 to Lidikay, there is disclosed a crown lining apparatus which includes a pair of counter rotating cutting blades and a mechanism for making timing adjustments to the blades without stopping the apparatus. In addition to a drive sprocket for driving the belt and a pair of driven sprockets for rotating the cutting blades, The Lidikay device provides an elongated carrier member which carries a pair of spaced idler sprocket wheels and a shiftable idler pulley. The carrier defines a plurality of teeth and is shifted laterally by rotating a spur gear having teeth which engage the teeth on the carrier member. By laterally shifting the carrier, the belt can be momentarily advanced or withdrawn relative to the driven sprockets, thereby changing the timing of the cutting blades. Like the Aichele device, however, the Lidikay system also lacks any provision for selectively adjusting the tension of the belt during operation.

SUMMARY OF THE INVENTION

The present invention provides an improved apparatus which can dispense predetermined quantities of thermoplastic material severed by a cutting means accurately into the centers of moving, open-topped receptacles, such as crowns or caps being transported by a conveyor. Another aspect of the present invention relates to a reliable means for selectively coordinating the cutter means with the movement of the conveyor so that severed portions of thermoplastic material may be deposited into the centers of the receptacles. In addition, the present invention provides a simple yet precise means for selectively modifying the tension in the belt without disrupting the continuous process of cutting and depositing thermoplastic material into the conveyed receptacles.

Specifically, the present invention provides an apparatus for dispensing predetermined amounts of thermoplastic material into a plurality of open topped receptacles. This apparatus includes means for conveying the receptacles at predetermined speeds along a receiving path, means positioned adjacent the receiving path for extruding a predetermined quantity of thermoplastic material through a discharge passage into a receptacle, cutting means including a knife positioned adjacent the discharge passage for cutting the thermoplastic material into the predetermined quantity, and drive means for driving the cutting means and the conveying means. The drive means includes first means for driving the conveyor at a predetermined rate, second means including a belt for driving the cutting means at a constant rate synchronous with the predetermined rate and a drive pulley for driving the belt, timing adjustment means for incrementally altering the angular position of the knife during operation of the apparatus, and means associated with the timing adjustment means for selectively adjusting the tension of the belt.

The cutting means includes a shaft coupled to the knife and the second means further includes a driven pulley for driving the shaft, the driven pulley being in driven engagement with the belt. The timing adjustment means includes first and second idler pulleys engaging the belt between the drive pulley and the driven pulley, carrier means for supporting the first and second idler pulleys, and means for shifting the carrier means transversely of the direction of movement of the belt. The carrier means comprises a first support means for supporting the first idler pulley and second support means for supporting the second idler pulley.

The means for selectively adjusting the tension of the belt interconnects the first and second support means. The first support means comprises a first block member coupled to the first idler pulley and the second support means comprises a second block member coupled to the second idler pulley. The means for selectively adjusting is adapted to change the distance between the first and second idler pulleys, whereby the tension in the belt is adjusted by changing said distance. Preferably, the means for selectively adjusting the tension is an elongated member having a first threaded shaft portion and a second threaded shaft portion, the first block member defining a threaded axial bore for receiving the first threaded shaft portion and the second block member defining a threaded axial bore for receiving the second threaded shaft portion. Preferably, the elongated member also includes an intermediate portion between the first and second threaded shaft portions, the intermediate portion having a polygonal cross section.

The means for shifting the carrier means preferably comprises a third threaded shaft portion and the first block member further defines a second axial bore for receiving the third threaded shaft portion, whereby the carrier means is moved laterally in response to rotation of the threaded shaft member. The adjusting means preferably comprises a threaded shaft portion and a knob portion coupled thereto, and the carrier means defines a correspondingly threaded axial bore for receiving the threaded shaft portion, whereby the carrier means is moved laterally in response to rotation of the knob member.

Other advantages of the invention will become apparent from the following description and drawings.

DETAILED DESCRIPTION

Figure 1:
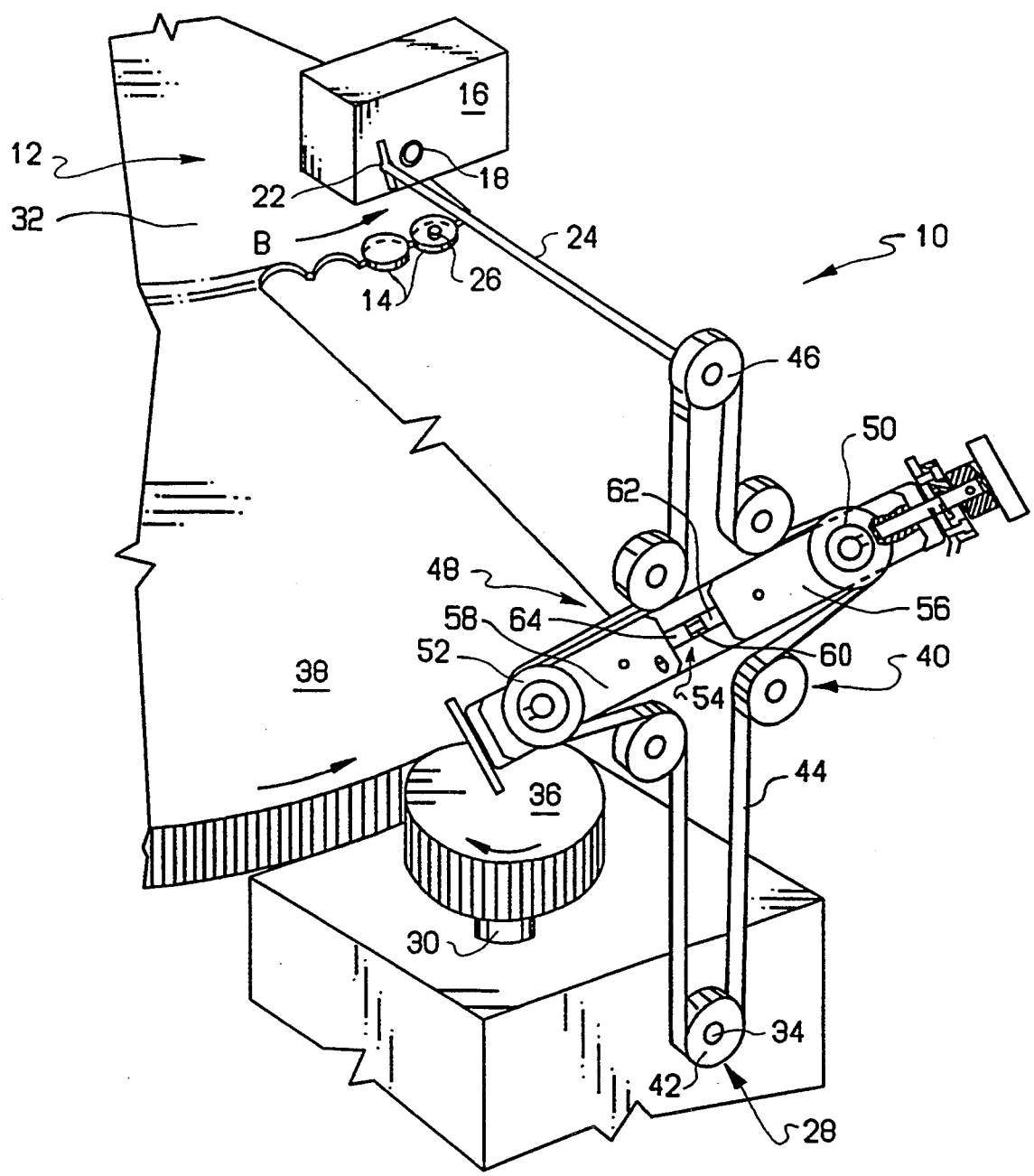
FIG. 1 is a perspective view of a plastic processing system utilizing the knife drive timing system of the present invention.

As most clearly seen in FIG. 1, the apparatus 10 of the present invention includes an endless conveyor 12 supported for rotation about a fixed vertical axis (not shown). Conveyor 12 supports a plurality of open-topped receptacles 14, such as crown caps, and moves them along an arcuate receiving path. An extruder 16 positioned above and adjacent to conveyor 12 produces a continuous supply of thermoplastic material along a horizontal discharge path. Thermoplastic material 18 exiting the discharge opening 20 of extruder 16 is disposed directly above the receptacles traveling in the receiving path.

A cutting means, preferably comprising a dual bladed knife 22, is positioned adjacent discharge opening 20 and is supported on shaft 24 for rotation about a horizontal axis. Each time knife 22 is rotated 180°, a segment 26 of thermoplastic material is severed and deposited into an open-topped receptacle 14 passing below in the receiving path.

The speed of conveyor 12, feed rate of extruder 16, and frequency of operation of knife 22 are all proportional at any rate of production for a particular material, to ensure that a metered charge is deposited into each receptacle. The synchronization of the operating speeds of conveyor 12 and knife 22 may accomplished by any conventional power transmission means. In the embodiment shown in FIG. 1, the apparatus 10 includes a speed reduction mechanism 28 such as a reduction gear box whose input shaft is connected to an output shaft of a conventional electric motor (not shown). The reduction mechanism 28 has a first output shaft 30 for rotating a turret 32 of conveyor 12 so as to convey receptacles at predetermined speeds and a second output shaft 34 for driving knife 22 at a constant rate synchronous to the predetermined rate for the conveyor. A gear 36 is fixed to the first output shaft 30 and comes into engagement with rotatably mounted gear 38. Turret 32 is connected to gear 38 and is adapted to rotate therewith. Accordingly, turret 32 is rotated at a uniform predetermined speed in the direction of arrow B via first output shaft 30, and gears 36 and 38.

In order to ensure that the segments of extruded material are deposited in the centers of the crown receiving caps, second output shaft 34 and knife shaft 24 are coupled together by an endless belt timing mechanism 40. The timing mechanism comprises a drive pulley 42 secured to second output shaft 34 and an endless belt 44 which is in driven engagement therewith. The timing mechanism further comprises a driven pulley 46 which is secured to knife shaft 24 and which is in driven engagement with endless belt 44. Since driven pulley 42 is driven directly by the same power source as gear 38, knife 22 is driven in synchronous relation with conveyor 10.

According to the invention, the driving relation between drive pulley 42 and driven pulley 46 can be changed while the unit is operating by adjustable means 48 so that a separated portion of hot plastic material is deposited at a predetermined position in a crown cap recess.

Figure 2:
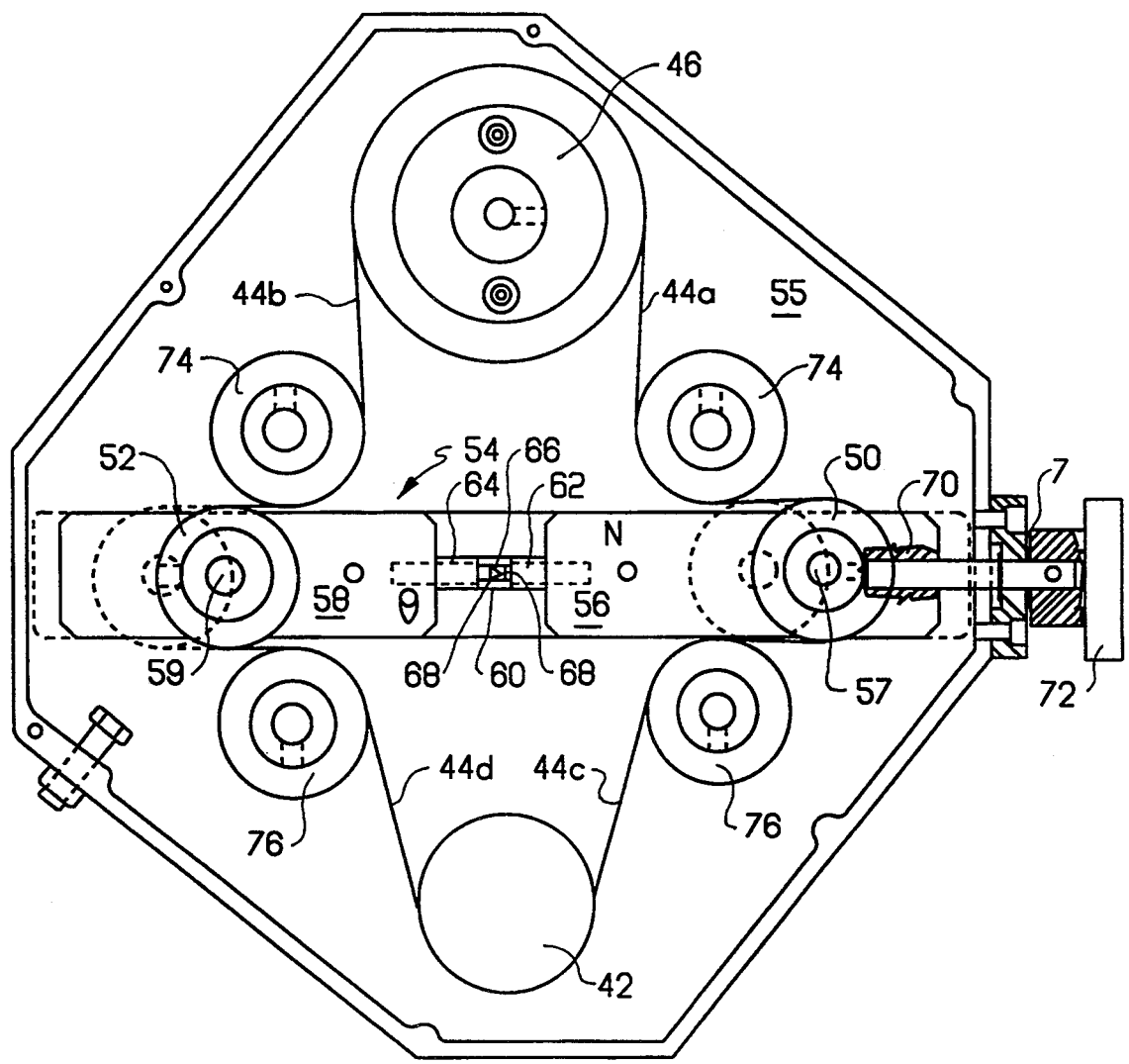
FIG. 2 is a partial elevation view illustrating the timing and belt tension adjustment means of the present invention.

Adjustable means 48 includes a pair of idler pulleys 50, 52 engaging endless belt 44 at a location between drive pulley 42 and driven pulley 46. Idler pulleys 50 and 52 are supported on a laterally shiftable carrier 54. As best shown in FIG. 2, carrier 54 comprises a pair of aligned block members 56, 58, which are interconnected along their respective central axes by an elongated member 60. The block members are arranged for sliding movement within a slot defined in the surface of a stationary support member 55. Pulley 50 is rotatably secured to block member 56 by rotating shaft 57. In an identical manner, pulley 52 is secured to block member 58 by rotating shaft 59.

Elongated member 60 has an axial end portion 62 with a righthand thread and an axial end portion 64 with a lefthand thread. Block member 56 defines an axial bore which is correspondingly threaded to receive axial end portion 62 and block member 58 is correspondingly threaded to receive axial end portion 64. In order to permit adjustments in belt tension, member 60 may be rotated about its longitudinal central axis N in either direction, thereby increasing or decreasing the spacing between pulleys 50 and 52. To this end, a drive portion 66 is located intermediate the threaded axial end portions 62 and 64 and receives a suitable tool (not shown) for applying a torque to the member 60. The drive portion 66 preferably has a hexagonal shape taken in a plane extending perpendicular to the longitudinal central axis N of the member 60 and includes diametrically opposite flats 68 which can be engaged by a wrench for rotating the member 60. The drive portion 66 preferably also includes an opening 68 centrally located in each of the flats for receiving a projection from a tool for rotating the member 60.

Block member 56 further defines a second axial bore which is threaded to receive the correspondingly threaded shaft 70 of timing adjustment knob 72. Rotation of knob 72 causes carrier 54 to shift laterally as a unit. The timing mechanism further includes two additional pairs of idler pulleys 74 and 76 that respectively engage an opposite surface of endless belt 44 above and below carrier 54. Idler pulleys 74 are positioned to define substantially vertically extending belt segments 44a and 44b above carrier 54, while idler pulleys 76 are positioned to define substantially vertical belt segments 44c and 44d below carrier 54.

The adjustment of the synchronous relation between conveyor 12 and knife 22 will now be described. Assuming that speed reduction mechanism 28 is inoperative, shaft 34, drive pulley 42, and idler pulleys 76 will define a fixed position for the lower end of endless belt 44. Shifting carrier 54 to the left, as viewed in the drawing, by rotation of knob 72 will locate the idler pulleys 50 and 52 in the dotted line position shown in FIG. 2. Since the lower portion of endless belt 44 remains fixed below idler pulleys 76, belt segment 44a must be moved upwardly while belt segment 44b must move downwardly to accommodate the lateral shifting of idler pulleys 50 and 52. It will be appreciated that shifting the carrier to the right will move the belt in the opposite direction. Thus, rotation of knife 22 may be advanced or retarded as required to reposition the severed portion of the thermoplastic extrudate with respect to the receiving path defined by conveyor 12. As was indicated above, such adjustment may readily take place while the apparatus is in operation so that the operator can accurately position the respective severed portions in the center of the respective crown caps.

Thus, it will be seen that the present invention provides a simple and inexpensive mechanism for adjusting the position of a severed portion of thermoplastic extrudate relative to the recessed surface of a crown cap. It will also be seen that the present invention permits the tension of the timing belt to be periodically adjusted so that undesirable wear of the belt can be easily avoided. Further, the present invention permits such adjustments to be made without interrupting the operation of the apparatus.

As will be apparent to those of ordinary skill in the art, various modifications and adaptations of the structure above described will become readily apparent without departure from the spirit and scope of the invention, the scope of which is defined in the appended claims.

What is claimed is:

1. An apparatus for dispensing segments of thermoplastic material into a plurality of open topped receptacles comprising:
    means for conveying said receptacles at predetermined speeds along a receiving path;
    means positioned adjacent said receiving path for extruding a predetermined quantity of thermoplastic material through a discharge passage into a receptacle;
    cutting means including a knife positioned adjacent said discharge passage for cutting said thermoplastic material into said predetermined quantity; and
    drive means for driving said cutting means and said conveying means, said drive means including first means for driving said conveyor at a predetermined rate, first and second idler pulleys, second means including a belt for driving said cutting means at a constant rate synchronous with said predetermined rate and a drive pulley for driving said belt, timing adjustment means for incrementally altering the angular position of said knife during operation of said apparatus, and means in said timing adjustment means for selectively adjusting the tension of said belt by changing the distance between the first and second idler pulleys.

2. The apparatus according to claim 1, wherein said cutting means further includes shaft means coupled to said knife and wherein said second means further includes a driven pulley for driving said shaft means, said driven pulley being in drivable engagement with said belt.

3. The apparatus according to claim 2, wherein said first and second idler pulleys engage said belt between said drive pulley and said driven pulley, and said timing adjustment means includes carrier means for supporting said first and second idler pulleys, and means for shifting said carrier means transversely of the direction of movement of said belt.

4. The apparatus according to claim 3, wherein said carrier means comprises a first support means for supporting said first idler pulley and second support means for supporting said second idler pulley.

5. The apparatus according to claim 4, wherein said means for selectively adjusting the tension of said belt interconnects said first and second support means.

6. The apparatus according to claim 5, wherein said first support means comprises a first block member coupled to said first idler pulley and said second support means comprises a second block member coupled to said second idler pulley and wherein said means for selectively adjusting the tension is adapted to change the distance between said first and second idler pulleys, whereby the tension in said belt is adjusted by changing said distance.

7. The apparatus according to claim 6, wherein said means for selectively adjusting the tension is an elongated member having a first threaded shaft portion and a second threaded shaft portion, said first block member defining a threaded axial bore for receiving said first threaded shaft portion and said second block member defining a threaded axial bore for receiving said second threaded shaft portion.

8. The apparatus of claim 7, wherein said elongated member further includes an intermediate portion between said first and second threaded shaft portions, said intermediate portion having a polygonal cross section.

9. The apparatus of claim 7, wherein said means for shifting said carrier means comprises a third threaded shaft portion and wherein said first block member further defines a second axial bore for receiving said third threaded shaft portion, whereby said carrier means is moved laterally in response to rotation of said threaded shaft member.

10. The apparatus of claim 3, wherein said adjusting means comprises a threaded shaft portion and a knob portion coupled thereto, and wherein said carrier means defines a correspondingly threaded axial bore for receiving said threaded shaft portion, whereby said carrier means is moved laterally in response to rotation of said knob member.

11. An apparatus for dispensing segments of thermoplastic material into a plurality of open topped receptacles comprising:
   means for conveying said receptacles at predetermined speeds along a receiving path;
   cutting means, including a rotating knife blade and a shaft coupled to said knife blade, for cutting said thermoplastic material into segments;
   first means for driving said conveying means at a predetermined rate;
   second means, including a belt and a driven pulley coupled to said knife blade shaft, for driving said knife blade at a constant rate synchronous with said predetermined rate;
   timing adjustment means in said second drive means for changing the angular position of said knife blade relative to said conveyor, said timing adjustment means including first and second idler pulleys engaging said belt, carrier means for supporting said first and second idler pulleys, and means for shifting said carrier means transversely of the direction of movement of said belt; and
   means on said carrier means for selectively modifying the tension in said belt by changing the distance between the first and second idler pulleys.

12. The apparatus of claim 11, wherein said carrier means comprises a first support means for supporting said first idler pulley and second support means for supporting said second idler pulley.

13. The apparatus of claim 12, wherein said means for selectively adjusting the tension of said belt interconnects said first and second support means.

14. The apparatus of claim 13, wherein said means for selectively adjusting the tension comprises means for changing the distance between said first and second idler pulleys, whereby the tension in said belt is adjusted by changing said distance.

15. The apparatus of claim 12, wherein said first support means comprises a first block member coupled to said first idler pulley and said second support means comprises a second block member coupled to said second idler pulley.

16. The apparatus of claim 15, further comprising frame means for slidably supporting said first and second support means.

17. The apparatus of claim 15, wherein said means for selectively adjusting the tension comprise means interconnecting said block members, said interconnecting means being operable to change the distance between said first and second idler pulleys, whereby the tension in said belt is adjusted by changing said distance.

18. The apparatus of claim 11 further comprising means positioned adjacent said receiving path for extruding a predetermined quantity of thermoplastic material through a discharge passage into a receptacle, wherein said cutting means is positioned adjacent said discharge passage.

19. An apparatus for dispensing segments of thermoplastic material into a plurality of open topped receptacles comprising:
   a belt driven system for rotating a cutting knife synchronously with a conveyor driven at a predetermined rate, said conveyor conveying said receptacles, said belt drive system including:
   an endless belt for driving said cutting knife at a constant rate synchronous with said predetermined rate;
   a driving element in driving engagement with said belt;
   a driven element in driven engagement with said belt, said driven element being coupled to said cutting knife;
   timing adjusting means including first and second idler elements for engaging said belt and for incrementally altering the angular position of said driven element during operation of said apparatus; and
   means on said timing adjustment means for selectively adjusting the tension of said belt by changing the distance between the first and second idler elements.

20. The apparatus according to claim 19, wherein said first and second idler elements engage said belt between said driving element and said driven element, and said timing adjustment means includes carrier means for supporting said first and second idler elements, and means for shifting said carrier means transversely of the direction of movement of said belt.

21. The apparatus according to claim 20, wherein said carrier means comprises a first support means for supporting said first idler element and second support means for supporting said second idler element.

22. The apparatus according to claim 21, wherein said first support means comprises a first block member coupled to said first idler element and said second support means comprises a second block member coupled to said second idler element and wherein said means for selectively adjusting the tension is adapted to change the distance between said first and second idler pulleys, whereby the tension in said belt is adjusted by changing said distance.

* * * * *